United States Patent [19]

Hori et al.

[11] Patent Number: 4,493,632

[45] Date of Patent: Jan. 15, 1985

[54] SPACER IN METAL-MOLD VULCANIZER FOR RUBBER HOSE

[75] Inventors: Yoshimi Hori; Takashi Ishida, both of Gifu; Keizo Hayashi, Nagoya, all of Japan

[73] Assignee: Toyoda Gosei Co., Ltd., Nishikasugai, Japan

[21] Appl. No.: 452,864

[22] Filed: Dec. 23, 1982

[30] Foreign Application Priority Data

Dec. 23, 1981 [JP] Japan .................... 56-192076[U]

[51] Int. Cl.³ .............................................. B29C 1/00
[52] U.S. Cl. ................................ 425/393; 249/187 R; 264/325; 264/347; 425/395; 425/403; 425/468
[58] Field of Search ............... 425/392, 393, 340, 501, 425/502, 517, 519, 520, 395, 403, 468, 81 Z, 383, DIG. 42; 264/257, 236, 339, 347, 149, 325; 249/175, 177, 187 R, 142, 144

[56] References Cited

U.S. PATENT DOCUMENTS

| | | | |
|---|---|---|---|
| 897,309 | 1/1908 | Sill | 425/392 |
| 1,130,030 | 3/1915 | Sill | 425/392 |
| 1,337,930 | 4/1920 | Lowe | 425/393 |
| 3,371,381 | 3/1968 | Louth | 425/393 |

FOREIGN PATENT DOCUMENTS

| | | |
|---|---|---|
| 1159161 | 6/1964 | Fed. Rep. of Germany . |
| 49-45182 | 4/1974 | Japan . |
| 56-19818 | 5/1981 | Japan . |

Primary Examiner—Jay H. Woo
Assistant Examiner—Tinker R. McBrayer
Attorney, Agent, or Firm—Cushman, Darby & Cushman

[57] ABSTRACT

An annular spacer to be used, during the vulcanization in a metal mold of an unvulcanized rubber hose having a mandrel pierced therethrough, as fitted around the mandrel in intimate contact with either of the opposite ends of the aforementioned unvulcanized rubber hose. This annular spacer has an outside diameter greater than the inside diameter of the depression in the aforementioned metal mold and an inside diameter enough for the spacer to be inserted around the aforementioned mandrel, contains in the periphery thereof a plurality of grooves formed in the axial direction of the spacer, and is made of a material softer than the materials of the aforementioned metal mold and mandrel. By the use of such spacers of this invention having the aforementioned characteristics, therefore, rubber hoses of a fixed outside diameter can be manufactured in any desired length in one and the same metal mold.

3 Claims, 10 Drawing Figures

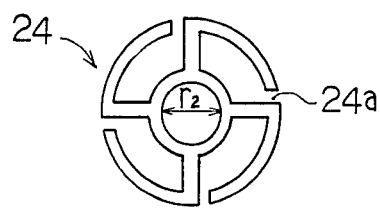
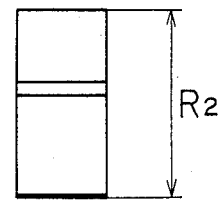
Fig. 3a  Fig. 3b
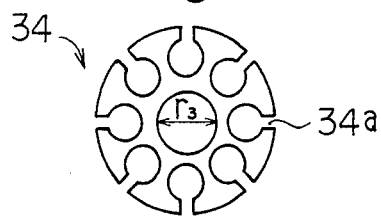
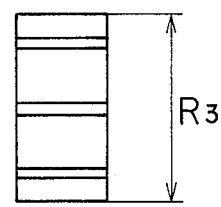
Fig. 4a  Fig. 4b
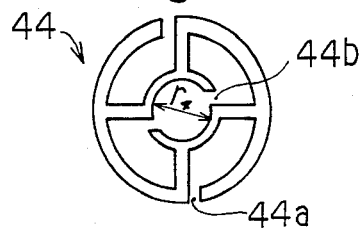
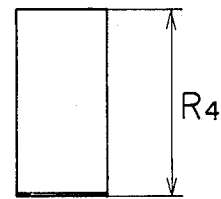
Fig. 5a  Fig. 5b
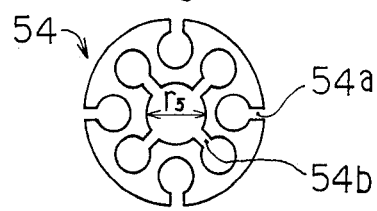
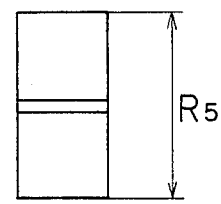
Fig. 6a  Fig. 6b

SPACER IN METAL-MOLD VULCANIZER FOR RUBBER HOSE

BACKGROUND OF THE INVENTION

1. Field of the Invention

This invention relates to an annular spacer which, during the vulcanization in a metal mold of an unvulcanized rubber hose having a mandrel pierced therethrough, is used as fitted around the mandrel in intimate contact with either of the opposite ends of the unvulcanized rubber hose.

2. Description of the Prior Art

Heretofore, in the manufacture of a vulcanized reinforced hose (rubber hose incorporating a reinforcing layer) by the use of a metal mold, it has been customary to effect the vulcanization by piercing a mandrel 2 through an unvulcanized hose 1 consisting of an inner rubber layer 1a, a reinforcing layer 1b, and an outer layer 1c, inserting the hose 1 as wrapped on the mandrel 2 in a cavity 3a of a metal mold 3, and subjecting the hose to a treatment for vulcanization. The metal mold 3 has formed each at the opposite ends of the cavity 3a a stepped portion 3b adapted for the mandrel 2 to be accurately supported along the axis of the cavity 3a so as to avoid otherwise possible loss of uniformity of the wall thickness of the hose.

The demand for hoses, however, has a general trend that even hoses of given inside and outside diameters are desired to be available in varying lengths. Consequently, the manufacture of hoses has necessitated use of numerous metal molds of dissimilar lengths.

Generally, the cavity in a metal mold is formed so that the longitudinal extent thereof may be about 1 to 2 mm greater than the length of unvulcanized hose. When the insertion of the unvulcanized hose in the metal mold and the removal of the vulcanized hose from the metal mold are performed by an automatic operation, even a positional deviation of only 3 to 4 mm suffered to occur in the insertion of the unvulcanized hose in the longitudinal central portion of the cavity of the metal mold can deprive the produced hose of its commercial value. For the elimination of such positional deviation, therefore, much time and labor is required in the setting of the equipment for the automatic operation.

SUMMARY OF THE INVENTION

An object of this invention is to provide a spacer for use in the cavity of a metal mold for manufacture of vulcanized rubber hoses, which spacer permits rubber hoses of one fixed outside diameter to be produced in desired lengths by the use of one and the same metal mold without inflicting any damage upon the metal mold or the mandrel during the vulcanization.

Another object of this invention is to provide a spacer for use in the cavity of a metal mold for manufacture of vulcanized rubber hoses, which spacer, when used in a plant wherein the insertion of an unvulcanized hose into the metal mold and the removal of produced vulcanized hose from the metal mold are carried out by an automatic operation, can be set at any desired position within the cavity of the metal mold without calling for any anxiety in regard to the possibility of positional deviation and, therefore, can facilitate the setting of the equipment for the automatic operation.

Yet another object of this invention is to provide a spacer for use in the cavity of a metal mold for manufacture of vulcanized rubber hoses, which spacer can be easily compressed and immobilized within the metal mold when the metal mold is closed tightly and, therefore, can enable the mandrel to be firmly retained at the center of the spacer so as to preclude otherwise possible loss of unfirmity of the wall thickness of the rubber hose to be finally produced.

A further object of this invention is to provide a spacer for use in the cavity of a metal mold for manufacture of vulcanized rubber hoses, which spacer is provided with grooves such that, during the vulcanization of a rubber hose, excess rubber or, in the case of a reinforced rubber hose, the water contained in the reinforcing fibers forming the reinforcing layer or the gas emanating from the solvent contained in the adhesive agent can easily escape therethrough from within the cavity, with the result that the rubber hose obtained after the vulcanization can be utilized as a product throughout the entire length between the opposite end faces thereof and, owing to this fact coupled with the fact that possible inconsistency of the unvulcanized rubber hoses in their longitudinal extent can be properly coped with by the use of the spacer, the yield of the manufacture of rubber hoses can be improved.

Still another object of this invention is to provide a spacer for use in the cavity of a metal mold for manufacture of vulcanized rubber hoses, which spacer has additional elasticity imparted to the inner boundary thereof so as to facilitate the insertion of the spacer around the mandrel.

BRIEF DESCRIPTION OF THE DRAWING

FIG. 3a is a front view illustrating a spacer as the second embodiment of the present invention.

FIG. 3b is a side view illustrating the spacer as the second embodiment of the present invention.

FIG. 4a is a front view illustrating a spacer as the third embodiment of the present invention.

FIG. 4b is a side view illustrating the spacer as the third embodiment of the present invention.

FIG. 5a is a front view illustrating a spacer as the fourth embodiment of the present invention.

FIG. 5b is a side view illustrating the spacer as the fourth embodiment of the present invention.

FIG. 6a is a front view illustrating a spacer as the fifth embodiment of the present invention.

FIG. 6b is a side view illustrating the spacer as the fifth embodiment of the present invention.

DESCRIPTION OF THE PREFERRED EMBODIMENTS

Figure 1:
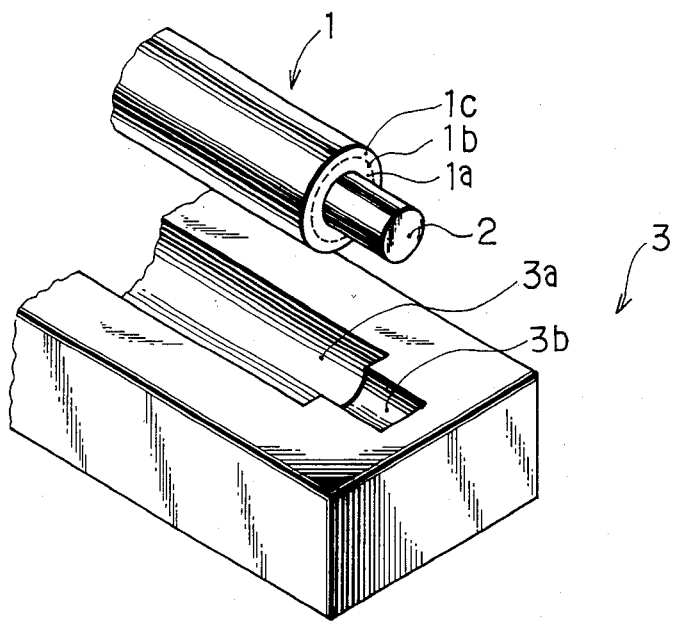
FIG. 1 is a perspective view illustrating the manner in which a conventional metal mold is used for vulcanizing a rubber hose.
Figure 2:
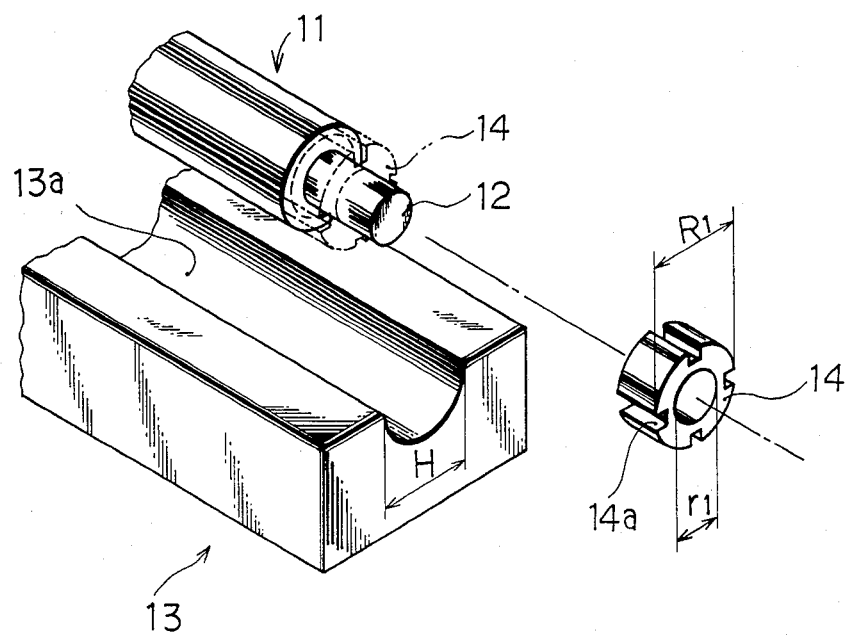
FIG. 2 is a perspective view illustrating the manner in which a spacer as the first embodiment of this invention is put to use.

Now, the present invention will be described more specifically below with reference to preferred embodiments of the invention.

A spacer 14 as the first embodiment has an outside diameter $R_1$ slightly greater (by about 0.05 to 0.1 mm) than the inside diameter H of a depression 13a in a metal mold 13 and an inside diameter $r_1$ (about 0.05 to 0.1 mm larger than the outside diameter of a mandrel 12) large enough for receiving the insertion of the mandrel 12. When the metal mold 13 and the mandrel 12 are formed of iron, for example, the spacer 14 is formed in an annular shape with a soft material such as brass, aluminum, or copper. In the periphery of the spacer 14, four grooves 14a are formed parallelly to the axial direction of the spacer.

Now, the vulcanization of an unvulcanized rubber hose 11 in the metal mold by the use of the spacer 14 will be described below.

Similarly to the unvulcanized hose illustrated in FIG. 1, the unvulcanized hose 11 in this embodiment consists of an inner rubber layer, a reinforcing layer, and an outer rubber layer. First, the mandrel 12 is pierced through the unvulcanized hose 11. Then two such spacers 14 are inserted one each around the opposite ends of the mandrel 12 and pressed against the opposite end faces of the unvulcanized hose 11.

Subsequently, the unvulcanized hose 11 as wrapped around the mandrel 12 is inserted into the depression 13a of the metal mold. The metal mold 13 is so formed that the depression 13a may have a uniform inside diameter H throughout the entire length therof and may open in the opposite end faces of the metal mold. Thus, the unvulcanized hose 11 having the spacers 14 fitted thereto and the mandrel 12 pierced therethrough can be inserted at any position inside the depression 13a of the metal mold. Owing to this fact, the setting of the equipment for the automatic operation is facilitated. With the metal mold using the spacer, therefore, an unvulcanized hose of any desired length can be set in position and vulcanized.

A movable piece of metal mold (not shown) containing a depression matched to the depression 13a is lowered to close the metal mold 13 tightly, with the unvulcanized hose held therein subjected to a treatment for vulcanization. When the metal mold 13 is closed, the spacers 14 which have an outside diameter $R_1$ greater than the inside diameter H of the depression 13a are easily compressed because they incorporate the grooves 14a in the periphery thereof, with the result that the spacers are immobilized within the metal mold 13. Consequently, the mandrel 12 is retained coaxially with the spacers 14 and along the radial center of the depression 13a of the metal mold. The possibility that the uniformity of wall thickness of the produced vulcanized hose will be impaired, therefore, is precluded. In this case, the spacers 14 will never inflict any damage to the metal mold 13 or the mandrel 12 because they are formed of a material softer than the materials of the metal mold 13 and the mandrel 12.

During the vulcanization, the water contained in the reinforcing fibers forming the reinforcing layer or the solvent contained in the adhesive agent used in the reinforcing layer may possibly give rise to a gas. The grooves 14a permit ready escape of the gas from within the metal mold. Similarly, excess rubber is allowed by the grooves 14a to escape from the metal mold. Consequently, the rubber hose obtained after the vulcanization can be utilized as a product throughout the entire length between the opposite end faces thereof. Owing to this fact coupled with the fact that possible inconsistency of unvulcanized rubber hoses in their longitudinal extent can be properly coped with by the use of the spacers, the yield of the manufacture of vulcanized rubber hoses can be improved.

After the vulcanization is completed, the movable piece of the metal mold is removed to open the metal mold. Then, the spacers 14 are relieved of the compression and, consequently, the reinforced hose can be easily removed in conjunction with the mandrel 12 and the spacers 14 from the metal mold.

Similarly to the spacers of the first embodiment, the spacers 24, 34, 44, and 54 respectively of the second, third, fourth, and fifth embodiments of the invention have outside diameters $R_2$, $R_3$, $R_4$, and $R_5$ slightly greater than the inside diameter H of the depression 13a of the metal mold and inside diameters $r_2$, $r_3$, $r_4$, and $r_5$ enough for being wrapped around the mandrel 12. They are each formed in an annular shape with a material softer than the materials of the metal mold 13 and the mandrel 12.

The spacer 24 of the second embodiment has four grooves 24a formed in the periphery thereof parallelly in the axial direction of the spacer 24. These grooves 24a have a greater width inside than in the peripheral surface.

The spacer 34 of the third embodiment has eight grooves 34a formed in the periphery parallelly to the axial direction of the spacer 34. These grooves 34a have a circular inner space so as to permit ready fabrication.

The spacer 44 of the fourth embodiment has two grooves 44a formed in the periphery thereof parallelly to the axial direction of the spacer 44. The grooves 44a have a greater width inside than in the peripheral surface. The spacer 44 has two grooves 44b formed in the inner periphery thereof. These grooves 44b have a greater width inside than in the inner peripheral surface.

The spacer 54 of the fifth embodiment has four grooves 54a formed in the periphery thereof parallelly to the axial direction of the spacer 54. The grooves 54a have a circular inner space. The spacer 54 further has four similar grooves 54b in the inner periphery. These grooves 54b have a similar circular inner space to permit ready fabrication.

The spacers of the second through fifth embodiments have the same operation and effect in the vulcanization of unvulcanized hose 11 in the metal mold as the spacer 14 of the first embodiment. Besides the effect, they severally manifest the following additional effects.

The spacer 24 of the second embodiment acquires added elasticity because it has grooves 24a of greater inner spaces. The added elasticity of the spacer 24 goes to increasing the ease with which the metal mold is opened or closed.

The spacer 34 of the third embodiment permits easy opening and closing of the metal mold because the grooves 34a thereof have inner spaces formed therein. It further provides satisfactory thermal conduction from the metal mold to the mandrel as compared with the spacer 24 of the second embodiment.

The spacer 44 of the fourth embodiment, similarly to that of the second embodiment, has large inner spaces in the grooves 44a and, therefore, permits easy opening and closing of the metal mold. Because the grooves 44b contain large inner spaces, the spacer 44 can be easily inserted around the mandrel and, when the metal mold is closed tightly, the spacer can be easily compressed and fastened safely around the mandrel.

The spacer 54 of the fifth embodiment, similarly to that of the third embodiment, permits easy opening and closing of the metal mold because the grooves 54a thereof contain large inner spaces. It further provides satisfactory thermal conduction from the metal mold to the mandrel as compared with the spacer of the fourth embodiment. Because the grooves 54b contain large inner spaces, the spacer 54 can be easily inserted around the mandrel and, when the metal mold is closed tightly, the spacer can be easily compressed and fastened safely around the mandrel.

Since the spacers of the second through fifth embodiments have grooves containing larger inner spaces than the spacer of the first embodiment, they permit readier escape of the water contained in the reinforcing fibers, the gas from the solvent contained in the adhesive agent, or the excess rubber during the vulcanization.

The spacers of the first through fifth embodiments have been described as possessing outer diameters $R_1$, $R_2$, $R_3$, $R_4$, and $R_5$ slightly larger than the inside diameter H of the depression of the metal mold. These outer diameters may be equal to the inside diameter H when the spacers 14, 24, 34, 44, and 54 are made of a material capable of being expanded by the heat of the vulcanization enough for the spacers to be immobilized in position within the metal mold.

The embodiments have been described with respect to a rubber hose which incorporates a reinforcing layer. In the case of manufacture of a rubber hose incorporating no reinforcing layer, the manufacture by the use of a metal mold proves less expensive when the quantity of production is small. Also in this case, the spacer of this invention can be advantageously used.

In the manufacture of rubber hoses having a fixed outside diameter and varying inner diameters, the conventional method has failed to attain the manufacture unless both the metal mold and the mandrel are changed whenever there is a variation in the inner diameter. When the spacers of the present invention are used, the manufacture can be accomplished by using one and the same metal mold and selecting mandrels having required diameters and spacers having inside diameters proportionate to the diameters of the mandrels, making it possible to reduce the cost of equipment.

What is claimed is:

1. An annular spacer to be used during the vulcanization of an unvulcanized rubber hose in a metal mold having a substantially cylindrical body made of softer material than material of said mold so that said body is prevented from inflicting any damage upon a depression of said mold whereinto said unvulcanized rubber hose is inserted, an outside diameter of said body being greater than an inside diameter of said depression in said metal mold, an inside diameter of said body being greater than a diameter of a mandrel on which said unvulcanized rubber hose is wrapped so that said mandrel may be inserted in said body, said body defining grooves formed parallel to the axial direction of said spacer and extending into at least said outer surface of said body permitting gas, escaping from within said mold and said body, to be deflected toward said grooves during the vulcanization of said unvulcanized rubber hose.

2. An annular spacer in a metal mold for manufacture of a vulcanized rubber hose according to claim 1, wherein said grooves have a greater width inside than along the surface of the spacer.

3. An annular spacer in a metal mold for manufacture of a vulcanized rubber hose according to claim 1 wherein a plurality of grooves are formed in the inner surface of the spacer in the axial direction of said spacer and said grooves have a greater width inside than along the inner surface of the spacer.

* * * * *